UNITED STATES PATENT OFFICE.

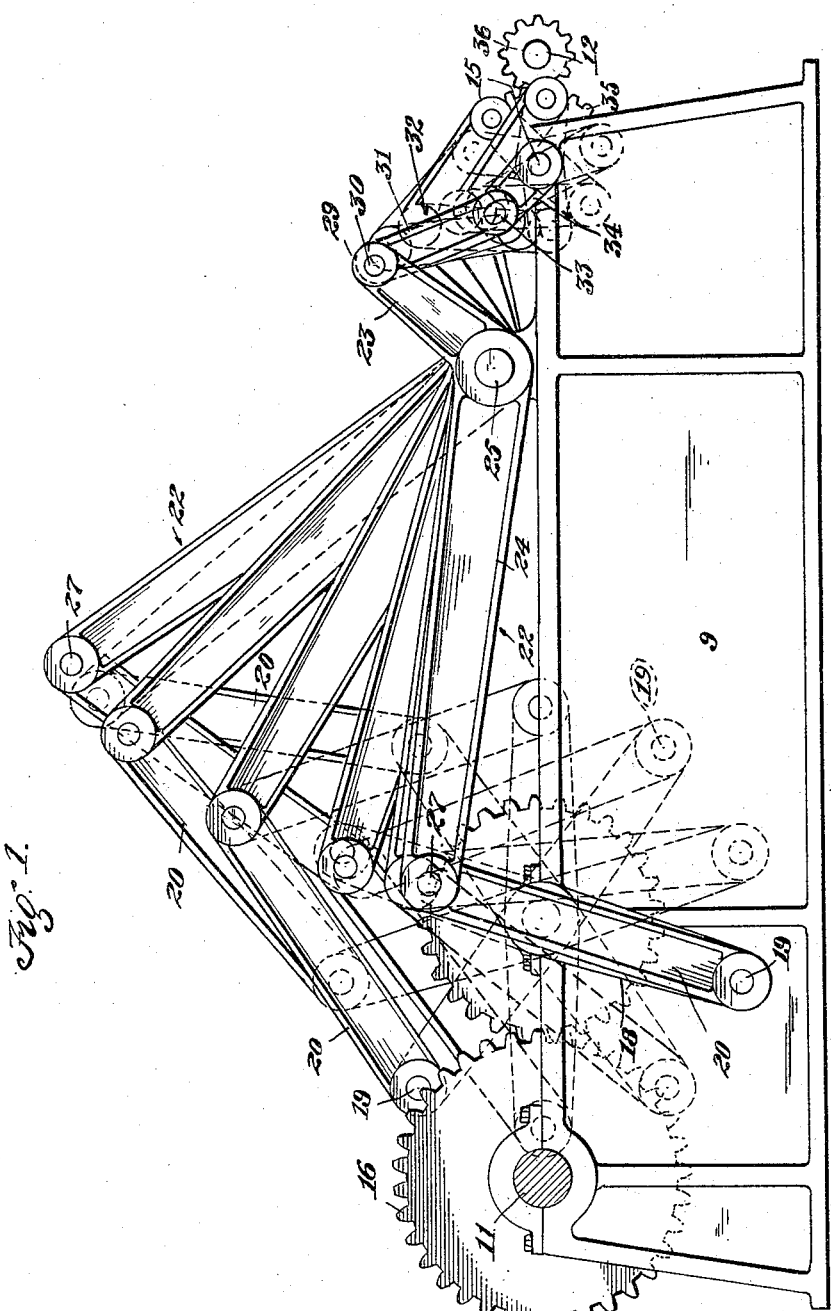

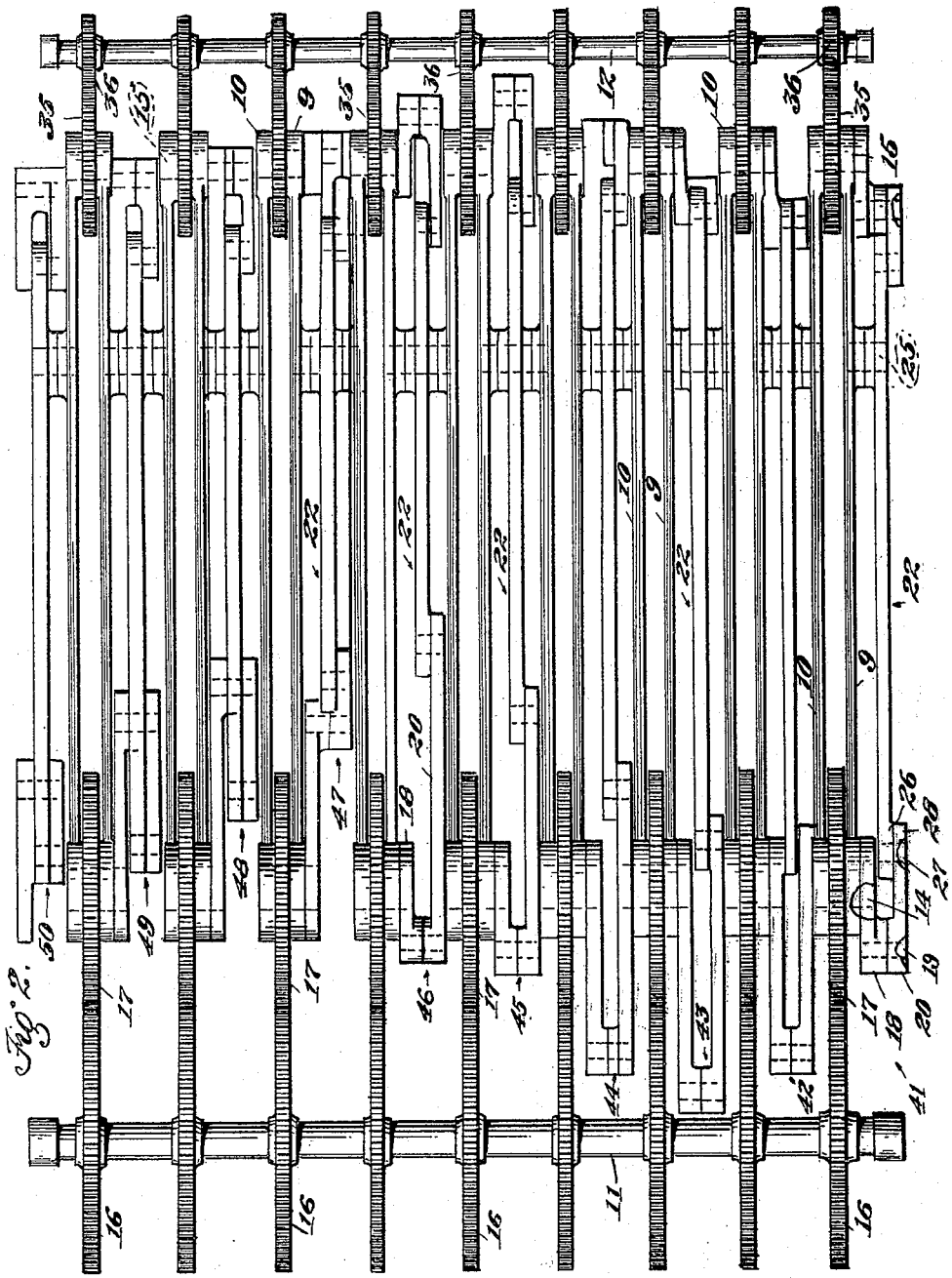

CHARLES E. NELSON, OF LOS ANGELES, CALIFORNIA.

MECHANICAL MOVEMENT.

1,204,476.  Specification of Letters Patent.  Patented Nov. 14, 1916.

Application filed September 7, 1915.  Serial No. 49,138.

*To all whom it may concern:*

Be it known that I, CHARLES E. NELSON, a citizen of the United States, residing at Los Angeles, in the county of Los Angeles and State of California, have invented new and useful Improvements in Mechanical Movements, of which the following is a specification.

My invention relates to a mechanical movement, and particularly pertains to a mechanism for transmitting rotary motion from one shaft to another.

It is the object of my invention to provide a mechanism for transmitting rotary motion from one gear to another by means of a walking beam, or lever to obviate the use of belts and pulleys, or chains and sprockets.

Another object is to provide a power transmission by means of which an increased ratio of force may be transmitted from a driving to a driven shaft by means of a walking beam, or lever, and which eliminates the factor of loss due to belt slippage on pulleys, or the loss caused by friction in the use of chains and sprockets, or gearing.

The invention is illustrated in the accompanying drawings, in which,

Figure 1, is a view in side elevation of the mechanical movement and showing the relative position of a plurality of walking beams employed therein in rotating a driven shaft from a driving shaft. Fig. 2, is a plan view of the mechanism.

More specifically, 9 and 10 indicate horizontally disposed frame members arranged parallel with each other and providing the base, or sub-structure of my device. Mounted in suitable bearings on the frame members 9 and 10 are a horizontally disposed driving shaft 11 and a driven shaft 12, which extend the full width of the machine, and arranged between the shafts 11 and 12 are short stud-shafts 14 and 15.

Mounted upon the driving shaft 11 to rotate therewith is a gear 16 which meshes with a gear 17 secured on the stud shaft 14. A radial arm 18 is mounted on the stud shaft 14, which arm is formed with a boss at its outer end within which is driven a wrist pin 19 extending outwardly to provide a pivotal mounting for a link 20. The link has a complementary boss at its outer end, so that sufficient clearance will be provided between the radial arm and the link to allow free passage of a bent lever or walking beam 22 between the two.

The lever 22 is composed of a short arm 23 and a long arm 24 disposed at an angle to the short arm and having provisions for its mounting upon a fulcrum pin 25, mounted to rotate within bearing on the sub-frame. The arm 24 is formed at its outer end with a boss 26 within which a pin 27 is mounted to pivotally engage with a suitable opening within the end 28 of the link 20. The short arm 23 is formed at its outer extremity with a boss 29 having a pin 30 mounted therein which engages one end of a short link 31. The opposite end of the link 32 is pivotally mounted upon a pin 33 secured to a short radial arm 34 mounted on the stud-shaft 15; the stud-shaft being mounted within a suitable bearing and carried upon the sub-frame, and has mounted upon it a gear 35 which in turn meshes with a gear 36 on the driven shaft 12.

It is evident that the unit described in the foregoing part of the specification will operate alone, but in order to insure against possibility of any irregularity in the rotation of the driven shaft, I have provided a series of such mechanisms, or units 41 to 50 inclusive, which are mounted alongside of each other, and are driven by a single driving shaft. The mechanism in turn is geared to drive a single driven shaft. To further insure against any possible irregularity in the rotation of the shafts, the arms 18 are disposed at angles to each other, the device I have here shown comprising 10 units, and the arms on the stud shafts are disposed at an angular relation of 36 degrees to each other. This will alleviate any unevenness in the movement of the driven shaft in relation to the driving shaft.

In the operation of the device, the driving shaft 11 is rotated by any suitable source of power and rotates the gears 16 which in turn rotate the driven gears 17 and the stud shafts 14. Rotation of the stud shafts 14 revolve the radial arms 18 thereon causing them to rock the levers, or walking beams 22 through the links 20. The rocking of the levers operates through the links 32 and arms 34 to revolve the stud shafts 15, which in turn revolve the gears 35 and 36 and effect the rotation of the driven shaft 12.

What I claim is:

1. In a mechanical movement the combination of a rotary stud shaft, a crank arm mounted thereon, a link pivotally connected to said arm, a bent lever having unequal arms with the long arm thereof pivotally connected to the link, a second link pivotally connected to the short arm of the lever, a crank arm connected to the last named link, and a rotary stud shaft on which said arm is mounted, said cranks being arranged at an angle to each other to avoid coming on a dead center with relation to each other.

2. In a mechanical movement the combination of a bent lever, having a long arm and a short arm, links connected to the outer ends of the lever, the link on the long arm of the lever being of greater length than the other link, a pair of spaced rotary stud shafts, a crank arm on one of said stud shafts connecting with the long link and a second crank arm on the other stud shaft connecting with the short link, said second arm being shorter than the first-named arm, said cranks being arranged at an angle to each other to avoid coming on a dead center with relation to each other.

3. In a mechanical movement, a combination of a driving stud shaft, a driven shaft in horizontal alinement therewith, a long crank arm secured upon the driving shaft, a short crank arm secured upon the driven shaft, a pivot shaft positioned between the two shafts adjacent the driven shaft and at a point above the horizontal axis of said shafts, a bent lever pivotally mounted upon said pivot shaft and formed with a short upwardly extending arm disposed adjacent the driven shaft and a long upwardly extending arm disposed adjacent the driving shaft, and suitable link members connecting the short lever arm with the short crank arm and the long lever arm with the long crank arm thereby insuring simultaneous rotation of the driven shaft and the driving shaft.

In testimony whereof I have signed my name to this specification.

CHARLES E. NELSON.

Copies of this patent may be obtained for five cents each, by addressing the "Commissioner of Patents. Washington, D. C."